United States Patent [19]  
Pounder et al.

[11] 4,440,030  
[45] Apr. 3, 1984

[54] FLUID FLOW METER

[75] Inventors: Edwin Pounder, LaCanada; Alan J. Arena; Michael Pawlowski, both of Chino; Adrian M. Totten, El Monte, all of Calif.

[73] Assignee: Signet Scientific Co., El Monte, Calif.

[21] Appl. No.: 352,534

[22] Filed: Feb. 26, 1982

[51] Int. Cl.³ .............................................. G01F 1/6
[52] U.S. Cl. .................................................. 73/861.87
[58] Field of Search ........... 73/861.87, 861.88, 861.92, 73/861.77, 861.79

[56] References Cited  
U.S. PATENT DOCUMENTS 1,070,470  8/1913  Hixon et al. ................. 73/861.88 X
1,397,502  11/1921  Cormany et al. ............... 346/141 X
3,093,973  6/1963  Williams ................................ 62/49
3,329,021  7/1967  Quesinberry et al. ........... 73/861.79
3,546,940  12/1970  Short ............................... 73/861.92
3,866,469  2/1975  Wepnyss ......................... 73/861.87
4,173,144  11/1979  Pounder ........................... 73/861.79

Primary Examiner—Gerald Goldberg  
Assistant Examiner—Brian Tumm  
Attorney, Agent, or Firm—Fulwider, Patton, Rieber, Lee & Utecht

[57] ABSTRACT

A fluid flow meter having a paddle wheel rotatably mounted in a cylindrical cavity and an inlet conduit and an outlet conduit tangentially aligned with the periphery of the cavity for directing a fluid to flow through it. The paddle wheel's axis of rotation is displaced from the cavity's centerline, in the direction of the inlet conduit and substantially perpendicular to the flow of fluid entering the cavity, such that the flow meter operates effectively over an extended range of Reynolds numbers, spanning both turbulent and laminar flows.

15 Claims, 8 Drawing Figures

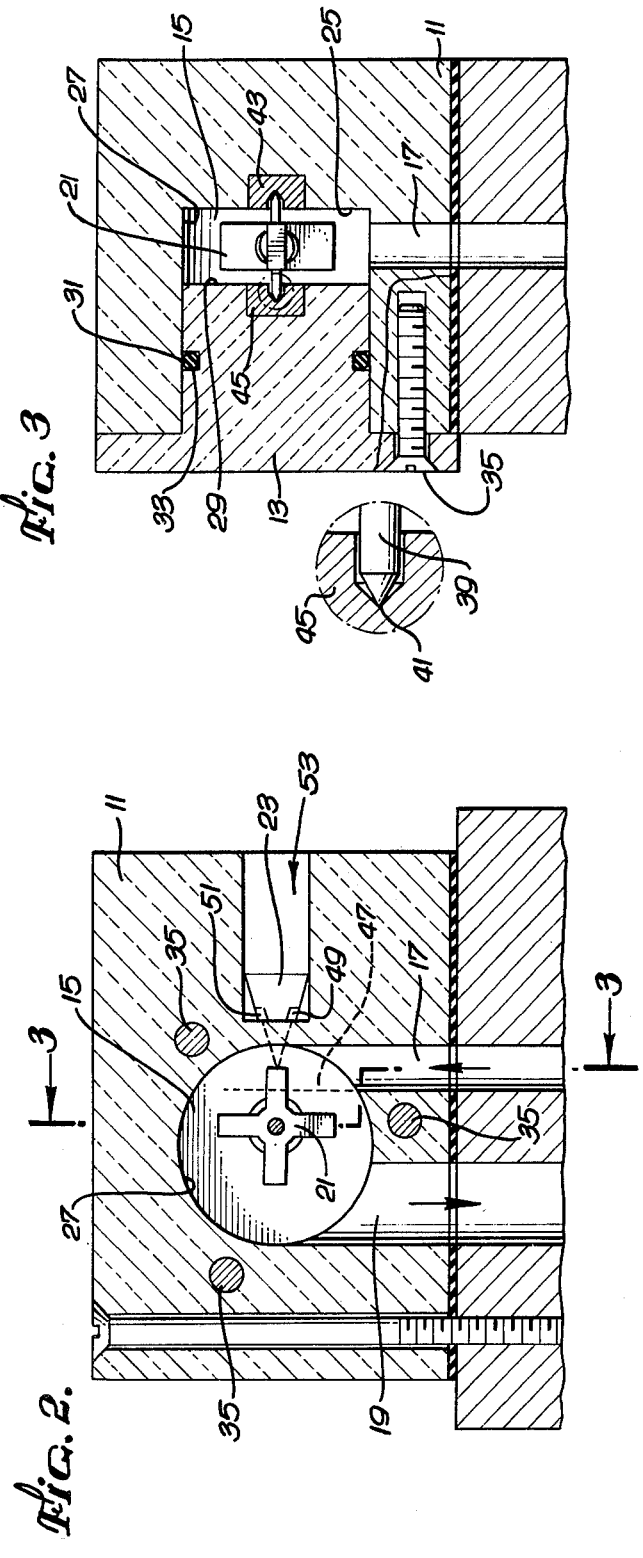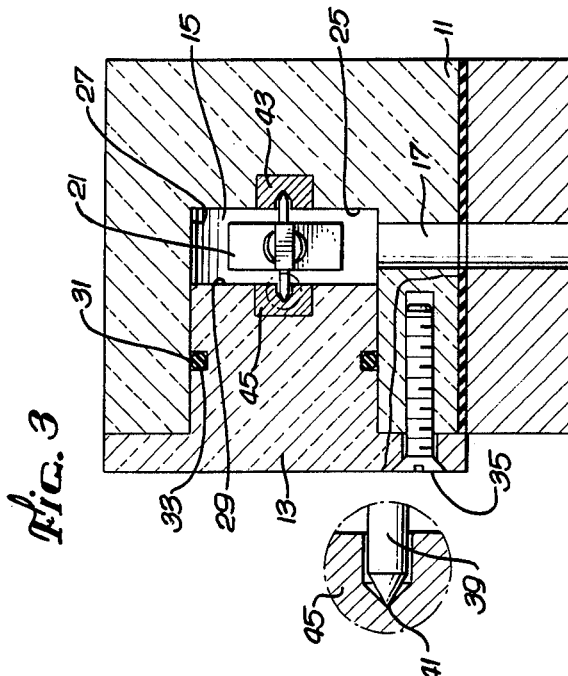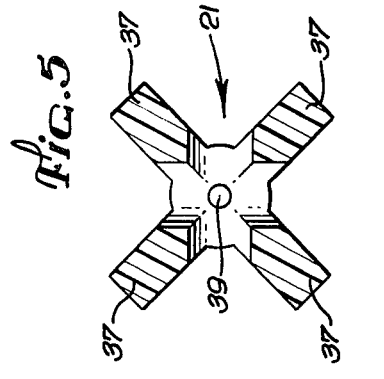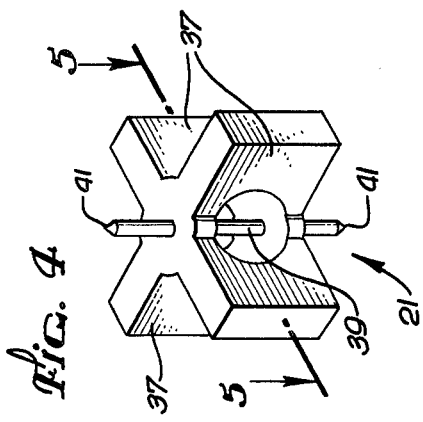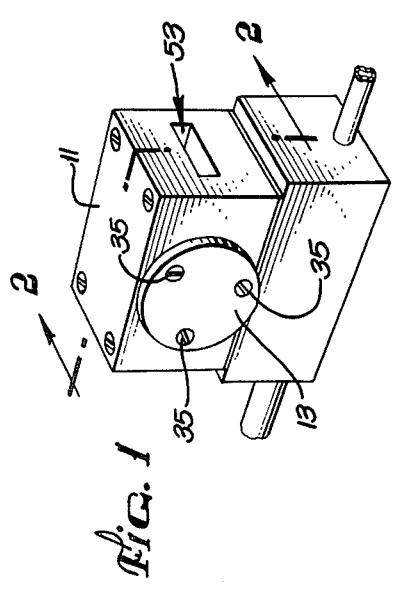

FLUID FLOW METER

BACKGROUND OF THE INVENTION

This invention relates generally to fluid flow meters, and more particularly to flow meters of a type having a paddle wheel rotatably mounted within a substantially cylindrical cavity.

An example of a fluid flow meter of this particular type is described in U.S. Pat. No. 4,173,144 to Edwin Pounder. It includes a paddle wheel mounted for rotation in a cylindrical cavity, and inlet and outlet conduits for directing a fluid to flow through the cavity and rotate the paddle wheel at an angular velocity corresponding generally to the flow rate. The paddle wheel rotates about an axis aligned with the cavity's longitudinal axis, and a special optical sensor senses its angular velocity to provide a signal indicative of the fluid flow rate.

Although flow meters like the one described above have generally performed satisfactorily, especially at relatively high flow rates, they are believed to be limited in the range of Reynolds numbers over which they can operate effectively. The devices are generally effective when measuring flows having relatively high Reynolds numbers, i.e., turbulent flow, but are generally ineffective for flows having relatively low Reynolds numbers, i.e., laminar flow. This can be a drawback in flow meter applications such as soft drink dispensers, where the viscosity of the fluids being dispensed can vary significantly and the flow can be either laminar or turbulent.

It should therefore be appreciated that there is a need for an improved paddle wheel type flow meter that can operate effectively for fluid flows covering an extended range of Reynolds numbers. There is particularly a need for a flow meter that can operate effectively for a range of Reynolds numbers spanning both turbulent and laminar flow regimes. The present invention fulfills this need.

SUMMARY OF THE INVENTION

The present invention is embodied in an improved paddle wheeltype fluid flow meter that operates effectively over an extended range of Reynolds numbers. The flow meter includes a housing having means defining a substantially cylindrical cavity, and inlet conduit means and outlet conduit means aligned substantially tangentially with the periphery of the cavity for directing a fluid to flow through it. The flow meter further includes paddle wheel means mounted in the cavity for rotation in accordance with the fluid flow, and means for sensing the angular velocity of the paddle wheel means and producing a corresponding signal. In accordance with the invention, the paddle wheel means is mounted for rotation about an axis displaced from the longitudinal axis of the cavity such that the fluid flow rotates the paddle wheel means in a prescribed direction over an extended range of Reynolds numbers.

More particularly, the inlet conduit means and the outlet conduit means are substantially parallel to each other, and the fluid travels in one plane substantially 180 degrees through the cavity, from the inlet to the outlet. Also, the outlet conduit means has a larger cross sectional area than the inlet conduit means, to reduce pressure losses, and both conduit means have cross sections that are preferably substantially circular. The paddle wheel includes a plurality of substantially evenly-spaced paddles, each having a hole at its base end.

To most effectively extend the operating range of the flow meter, the paddle wheel is displaced from the longitudinal axis of the cavity in the direction of the inlet conduit means, substantially perpendicular to the direction of fluid flow entering the cavity. At least a portion of the paddle wheel projects into an imaginary extension of the inlet conduit means into the cavity. In the preferred embodiment, the paddle wheel has a diameter approximately 60 percent that of the cavity, and it rotates about an axis located above one-third of the way from the longitudinal axis of the cavity to the edge of the imaginary extension of the inlet conduit means. The flow meter therefore operates effectively over a dynamic range of Reynolds numbers of at least about 400 to 1, spanning both turbulent and laminar flow regimes.

In another aspect of the invention, the paddle wheel rotates in a special needle bearing that includes a seal to prevent minute debris from becoming lodged in the bearing.

Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 1 is a perspective view of a fluid flow meter embodying the present invention;

FIG. 2 is a sectional view of the flow meter taken in direction of arrows 2—2 in FIG. 1;

FIG. 3 is a sectional view of the flow meter taken in the direction of arrows 3—3 in FIG. 2;

FIG. 4 is a perspective view of the paddle wheel depicted in FIGS. 2 and 3;

FIG. 5 is a sectional view of the paddle wheel taken in the direction of arrows 5—5 in FIG. 4;

DESCRIPTION OF THE PREFERRED EMBODIMENT

Figure 6:
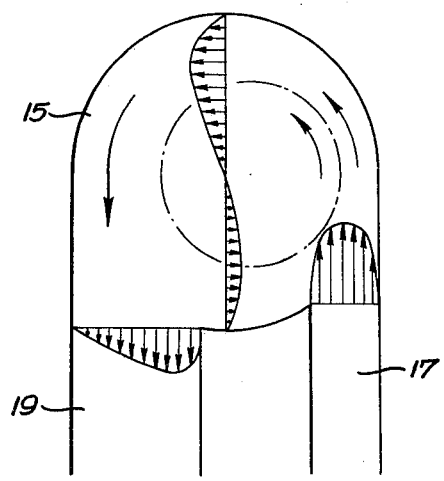
FIG. 6 is a schematic view of the flow meter's cylindrical cavity, showing the flow pattern for relatively high Reynolds numbers.

Referring now to the drawings, and particularly to FIGS. 1-3, there is shown an improved paddle wheel-type fluid flow meter that operates effectively over an extended range of Reynolds numbers, spanning both turbulent and laminar flows. The flow meter includes a housing comprising a base block 11 and a cap 13 that are fastened together and appropriately configured to form a cylindrical cavity 15 between them. An inlet conduit 17 supplies fluid to the cavity and an outlet conduit 19 carries the fluid away from it. The two conduits are substantially parallel to each other and oriented tangentially to the periphery of the cylindrical cavity such that the fluid travels substantially 180 degrees in one plane through the cavity.

The flow meter further includes a paddle wheel 21 that is mounted in the cylindrical cavity 15 for rotation in accordance with the flow rate of the fluid flowing through it. An optical sensor 23 located in the base 11 adjacent the cavity detects angular movement of the paddle wheel and provides a corresponding signal indicative of its angular velocity.

In accordance with the invention, the axis of rotation of the paddle wheel 21 is displaced from the longitudinal axis of the cylindrical cavity 15, in the direction of the inlet conduit 17 and substantially perpendicular to the inlet conduit's longitudinal axis. A portion of the paddle wheel projects into an imaginary extension of the inlet conduit into the cavity. This off-center displacement of the paddle wheel increases the range of Reynolds numbers over which the flow meter is effective, and in particular enables the flow meter to operate effectively in both turbulent and laminar flow regimens.

More particularly, and with particular reference to FIGS. 2 and 3, the base block 11 includes an annular recess having a planar bottom wall 25 that defines one side of the cylindrical cavity 15 and a circular side wall 27 that defines the periphery of the cavity. The cap 13 includes an annular projection that fits part way into the recess of the base block, to form the cavity. A planar bottom wall 29 of the cap forms the cavity's second side wall. An O-ring 31 is disposed in an annular seat 33 formed in the cap projection, to prevent fluid from flowing outwardly from the cavity into the space between the cap and the base block. Three screws 35 fasten the cap and base block securely together.

The inlet conduit 17 and the outlet conduit 19 both have circular cross sections, with the inlet conduit having a diameter about half the thickness of the cylindrical cavity 15 and the outlet conduit having a diameter substantially equal to the cavity thickness. This size difference minimizes choking and provides reduced pressure loss through the flow meter.

As shown in FIGS. 4 and 5, the paddle wheel 21 includes four evenly-spaced paddles 37 and a stainless steel shaft 39 at the center of the paddles with a needle point 41 on each of its ends. A hole is formed through the base of each paddle. Bearings 43 and 45 (FIG. 3) are disposed in recesses formed in the cavity's two side walls 25 and 29, respectively. The needle points of the paddle wheel shaft are received in seats in the two bearings, to keep the paddle wheel properly centered in the cavity 15 and to take any side load imposed on the paddle wheel by the moving fluid.

The bearings 43 and 45 further include integral seals for enveloping portions of the paddle wheel shaft 39 spaced from the respective need points 41. This prevents minute debris from becoming entangled in the needle bearings. There is sufficient clearance, however, to permit the fluid to lubricate the bearings. These seals also function as journal bearings for taking the flow load.

As shown in FIG. 2, the paddle wheel 21 has a diameter about 60 percent that of the cylindrical cavity 15 and rotates about an axis displaced from the center of the cavity, in the direction of the inlet conduit 17. In particular, this rotation axis is displaced about one-third of the way from the cavity's center to the edge of an imaginary extension of the inlet conduit, as shown by the dotted line 47. The paddle wheel therefore projects about halfway into the flow pattern of the inlet conduit. This paddle wheel placement has been found to extend significantly the range of Reynolds numbers over which the flow meter operates effectively, spanning both turbulent and laminar flows. The flow meter operates over a dynamic range of Reynolds numbers of at least about 400 to 1, and has substantially linear performance curve for a dynamic range of at least about 150 to 1.

The optical sensor 23 includes an LED light source 49 and a photodiode 51 located adjacent to each other in a recess 53 formed in the base block 11. The base block is preferably formed of a transparent polycarbonate material, to permit light from the light source to pass through it. One suitable optical sensor is a Model OPB 708 reflective object sensor, manufactured by TRW.

When the paddle wheel 21 rotates, the tips of its paddles 37 successively reflect light from the LED light source 49 to the photodiode 51. The frequency of the signal output by the photodiode therefore indicates the angular velocity of the rotating paddle wheel. Forming the paddle wheel of a highly reflective material, or painting the paddle tips with a highly reflective paint, increases the intensity of the light reflected to the photodiode and enchances the sensor's performance, especially when the fluid passing through the cavity 15 has at least some opacity.

Figure 7:
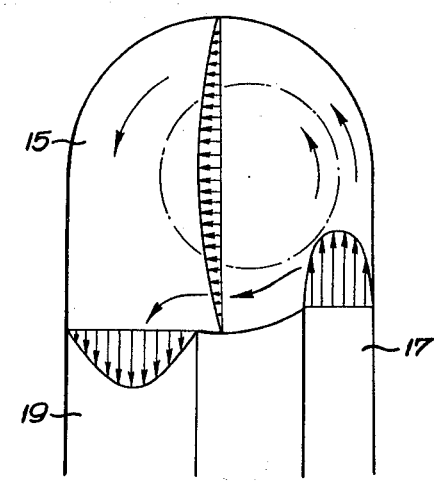
FIG. 7 is a schematic view of the flow meter's cylindrical cavity, showing the flow pattern for relatively low Reynolds numbers.

FIGS. 6 and 7 are schematic views of the cylindrical cavity 15 showing the flow pattern for a very high Reynolds number and turbulent flow (FIG. 6) and for a very low Reynolds number well below the laminar-turbulent transition (FIG. 7). It will be observed that for turbulent flow, a vortex is created within the cavity, whereas for the low Reynolds number laminar flow, there is no vortex and the fluid flows directly from the inlet conduit 17 to the outlet conduit 19. Locating the paddle wheel 21 in the position indicated insures that the moving fluid causes it to rotate in the same counter clockwise direction for flows spanning the entire range of conditions between those represented in FIG. 6 and 7.

Figure 8:
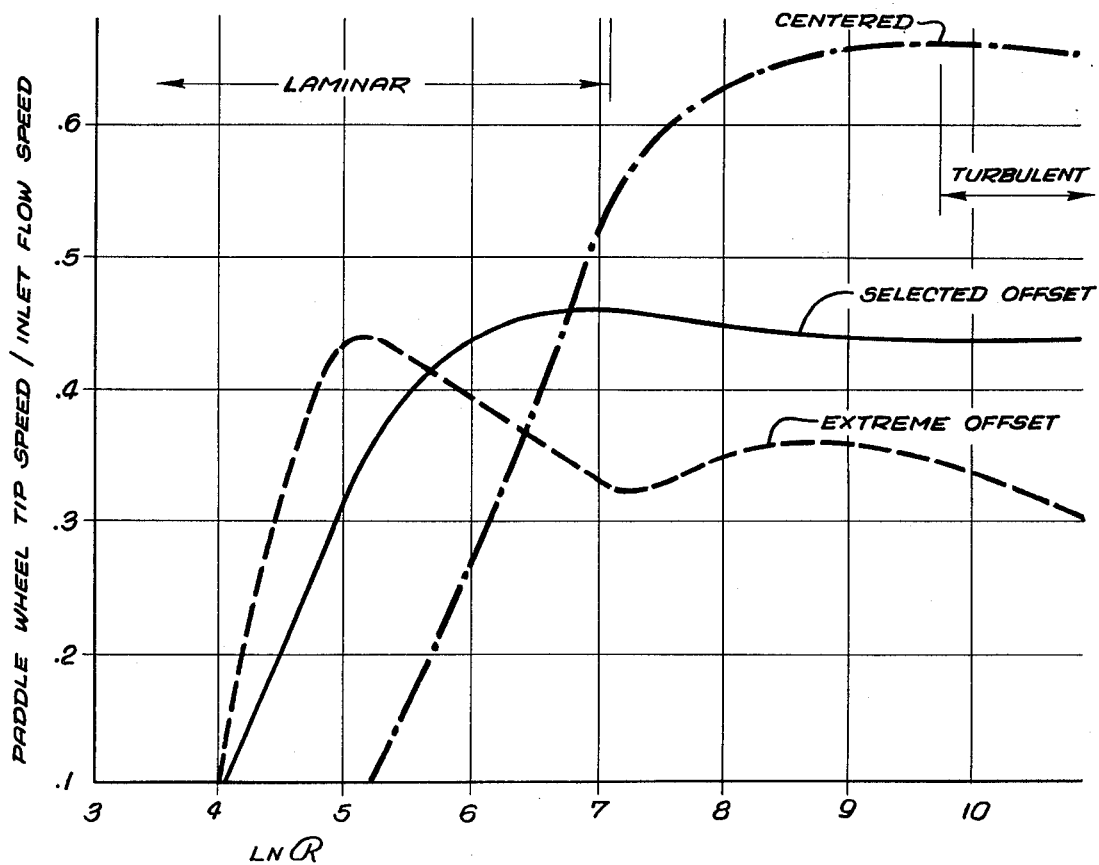
FIG. 8 is a graph showing the ratio of paddle wheel tip speed to inlet flow speed as a function of ln(Reynolds number), for three different paddle wheel locations, one being its location in the preferred embodiment of FIGS. 1-7.

FIG. 8 is a graph depicting the ratio of paddle wheel speed to inlet flow speed as a function of Reynolds number. One curve is for a flow meter having its paddle wheel coaxial with the cylindrical cavity's centerline, a second curve is for the flow meter of the preferred embodiment (FIGS. 1-7), and a third curve is for a flow meter having its paddle wheel rotating about an axis aligned with the edge 47 of the imaginary extension of the inlet conduit 17.

It is generally the case that moving the paddle wheel's rotation axis toward the inlet conduit 17 extends the flow meter's operating range to flows having lower Reynolds numbers. If it's moved as far as the edge of the inlet conduit's flow stream, however, the flow meter becomes somewhat non-linear, especially in the transition-region between turbulent and laminar flows. It should be appreciated, however, that if the fluid's viscosity is known, any non-linearity in the flow meter's performance curve can be compensated for by simply adjusting the optical sensor's output signal by a prescribed factor. The location of the paddle wheel in the preferred embodiment represents a good compromise location that only only extends the effective Reynolds number range but also provides improved linearity.

It should be appreciated from the foregoing description that the present invention provides an improved flow meter of a type having a paddle wheel rotatably mounted in a cylindrical cavity, and an inlet conduit and an outlet conduit for directing a fluid to flow through the cavity. The paddle wheel's axis of rotation is displaced from the cavity's centerline, in the direction of the inlet conduit, such that the flow meter operates effectively over a wider range of Reynolds numbers, spanning both turbulent and laminar flows.

Although the invention has been described in detail with reference to the presently preferred embodiment, it should be understood by those of ordinary skill in the art that various modifications can be made without departing from the scope of the invention. Accordingly, the invention is not to be limited except by the appended claims.

We claim:

1. A fluid flow meter comprising:
   a housing having means defining a substantially cylindrical cavity;
   inlet and outlet conduit means closely spaced to each other and aligned substantially tangentially with the periphery of the cavity, for directing a fluid to flow through a major portion of the cavity, from the inlet conduit means to the outlet conduit means;
   paddle wheel means mounted in the cavity for rotation in accordance with the fluid flow, the paddle wheel means including a plurality of substantially flat, evenly-spaced paddles; and
   means for sensing the angular velocity of the paddle wheel means and producing a corresponding signal;
   wherein the paddle wheel means is mounted for rotation about an axis displaced from but parallel to the longitudinal axis of the cavity such that the fluid flow rotates the paddle wheel means in a prescribed direction over an extended range of Reynolds numbers, spanning both turbulent and laminar flow regimes.

2. A fluid flow meter as defined in claim 1, wherein:
   the axis of rotation of the paddle wheel means is displaced from the longitudinal axis of the cavity in the direction of the inlet conduit means, substantially perpendicular to the direction of flow of the fluid entering the cavity; and
   the paddle wheel means projects at least part way into an imaginary longitudinal extension of the inlet conduit means into the cavity.

3. A fluid flow meter as defined in claim 2, wherein the axis of rotation of the paddle wheel means is located about one-third of the way from the longitudinal axis of the cavity to the edge of the imaginary longitudinal extension of the inlet conduit means into the cavity, and the paddle wheel means projects at least about halfway into the imaginary extension of the inlet conduit means.

4. A fluid flow meter as defined in claim 1, wherein the inlet conduit means and the outlet conduit means are substantially parallel to each other, but oppositely directed, and the fluid travels substantially 180 degrees in one plane through the cavity, from the inlet conduit means to the outlet conduit means.

5. A fluid flow meter as defined in claim 4, wherein the outlet conduit means has a cross sectional area greater than that of the inlet conduit means.

6. A fluid flow meter as defined in claim 1, wherein the inlet conduit means and the outlet conduit means both have substantially circular cross sections.

7. A fluid flow meter as defined in claim 1, wherein the substantially cylindrical cavity included in the housing is free of any fluid-diverting baffles.

8. A fluid flow meter as defined in claim 1, wherein each paddle of the paddle wheel means includes a hole through its base end.

9. A fluid flow meter as defined in claim 1, wherein:
   the paddle wheel means includes a rotatable shaft having a needle point at each end; and
   the housing includes first and second bearing means located on opposite sides of the cavity, each bearing means including
     a seat for receiving the shaft needle point at one end of the rotatable shaft, the seat being adapted to permit low-friction rotation of the needle point, and
     an annular seal for encircling a portion of the shaft adjacent its needle point to prevent minute debris from entangling in the bearing means.

10. A fluid flow meter comprising:
    a housing having means defining a cylindrical cavity;
    means defining an inlet conduit aligned tangentially with the cylindrical cavity, for delivering a fluid thereto;
    means defining an outlet conduit aligned tangentially with the cylindrical cavity, for removing fluid therefrom, the inlet and outlet conduits being substantially parallel to each other and displaced from each other such that the direction of the fluid flow is changed by about 180 degrees;
    a paddle wheel having a plurality of substantially flat, evenly-spaced paddles and mounted in the cylindrical cavity for rotation in accordance with the flow of fluid from the inlet conduit to the outlet conduit; and
    means for sensing the angular velocity of the paddle wheel and producing a corresponding signal;
    wherein the paddle wheel is mounted for rotation about an axis displaced from the centerline of the cylindrical cavity, in the direction of the inlet conduit and substantially perpendicular to the longitudinal axis of the inlet conduit, the paddle wheel projecting at least part way into the flow pattern of the fluid entering the cavity from the inlet conduit, whereby the paddle wheel is rotated by the fluid in a prescribed direction over an extended range of Reynolds numbers, spanning both turbulent and laminar flow regimes.

11. A fluid flow meter as defined in claim 10, wherein the axis of rotation of the paddle wheel is located about one-third of the way from the centerline of the cavity to the edge of an imaginary longitudinal extension of the inlet conduit into the cavity, and the paddle wheel projects at least about halfway into the imaginary extension of the inlet conduit.

12. A fluid flow meter as defined in claim 10, wherein:
    the outlet conduit has a cross sectional area greater than that of the inlet conduit; and
    the inlet conduit and the outlet conduit both have substantially circular cross sections.

13. A fluid flow meter as defined in claim 10, wherein:
    the paddle wheel includes a rotatable shaft having a needle point at each end; and
    the housing includes first and second bearing means located on opposite sides of the cylindrical cavity, each bearing means including
      a seat for receiving the shaft needle point at one end of the rotatable shaft, the seat being adapted to permit low-friction rotation of the needle point, and
      an annular seal for encircling a portion of the shaft adjacent its needle point, to prevent minute debris from entangling in the bearing means.

14. A fluid flow meter as defined in claim 10, wherein the diameter of the paddle wheel is about sixty percent that of the cylindrical cavity.

15. A fluid flow meter comprising:

a housing having means defining a cylindrical cavity;

means defining an inlet conduit aligned tangentially with the cylindrical cavity, for delivering a fluid thereto;

means defining an outlet conduit aligned tangentially with the cylindrical cavity, for removing fluid therefrom, wherein the inlet and outlet conduits are substantially parallel to each other and displaced from each other such that the direction of fluid flow is changed by about 180 degrees, and wherein the outlet conduit is larger than the inlet conduit and both have substantially circular cross sections;

a paddle wheel having a rotatable shaft with a needle point at each end and a plurality of substantially flat, evenly-spaced paddles, each paddle having a hole through its base end, the paddle wheel being mounted in the cylindrical cavity for rotation in accordance with the flow of fluid from the inlet conduit to the outlet conduit;

wherein the housing includes first and second bearing means located on opposite sides of the cylindrical cavity, each bearing means including a seat for receiving the shaft needle point at one end of the rotatable shaft, the seat being adapted to permit low-friction rotation of the needle point, and an annular seal for encircling a portion of the shaft adjacent its needle point, to prevent minute debris from entangling in the bearing means; and means for sensing the angular velocity of the paddle wheel and producing a corresponding signal;

wherein the paddle wheel is mounted for rotation about an axis located about one-third of the way from the centerline of the cylindrical cavity to the edge of an imaginary longitudinal extension of the inlet conduit into the cavity and the paddle wheel projects about halfway into the imaginary extension of the inlet conduit, such that the paddle wheel is rotated by the fluid in a prescribed direction over an extended range of Reynolds numbers, spanning both turbulent and laminar flow regimens.

* * * * *